United States Patent [19]

Arendale

[11] 3,925,845
[45] Dec. 16, 1975

[54] CARCASS POLISHER
[76] Inventor: Donald L. Arendale, 2516 Boysenberry, Bartlett, Tenn. 38134
[22] Filed: Apr. 25, 1974
[21] Appl. No.: 464,154

[52] U.S. Cl. ................................................. 17/18
[51] Int. Cl.² ........................................ A22B 5/08
[58] Field of Search ........................... 17/17, 18, 14

[56] References Cited
UNITED STATES PATENTS

| 2,245,545 | 6/1941 | Miller et al. | 17/18 |
| 3,021,557 | 2/1962 | Pinta et al. | 17/17 |
| 3,124,832 | 3/1964 | Kravetz | 17/18 |

FOREIGN PATENTS OR APPLICATIONS

| 1,178,019 | 1/1974 | United Kingdom | 17/17 |
| 28,645 | 11/1904 | United Kingdom | 17/18 |

Primary Examiner—Louis G. Mancene
Assistant Examiner—James D. Hamilton
Attorney, Agent, or Firm—John R. Walker, III

[57] ABSTRACT

An apparatus for removing scurf and singed hair from a suspended carcass which is free to rotate and is being conveyed in proximity thereto. Multiple pairs of brushes which rotate about their respective vertical axes are positioned on either side of the conveyor line to impart a twirling action to the carcass and to simultaneously vigorously scrub the entire area of the skin of the carcass.

12 Claims, 9 Drawing Figures

CARCASS POLISHER

BACKGROUND OF THE INVENTION

1. Field of the Invention

This invention relates to the field of carcass polishers.

2. Description of the Prior Art

Mechanical means for accomplishing scraping, dehairing, and other hog carcass processing tasks have been in existence for several decades. The applicant has knowledge of at least the following U.S. patents: The Jordan U.S. Pat. No. 1,232,448; the Talor U.S. Pat. No. 1,834,479; the Frederiksen U.S. Pat. No. 2,898,624; the Pinta et al U.S. Pat. No. 3,021,557; and the Frederiksen U.S. Pat. No. 3,304,575. None of the above patents disclose or suggest applicant's apparatus. Applicant also is aware of a carcass polisher marketed by St. John and Company which is further identfied as a Model 3346 Eight-Shaft Carcass Polisher. This latter carcass polisher incorporates hard rubber belt beaters which remove the slime and scurf from the skin of the carcass. The beaters are mounted on eight shafts and can be supplied with short sections of three-sixteenths inch B.B. chain.

It is significant to note that none of the above-mentioned prior devices is capable of removing all of the hair from the hog carcass. In fact, a typical meat processing plant normally requires five employees, called shavers, to manually shave the residual hair from the hog carcasses after they have passed through the carcass polisher, i.e., the five shavers being required when the kill is approximately 300 head per hour. The most troublesome areas for mechanical carcass polishers to remove hair from are the head and flank sections of the hog carcass. The above-mentioned U.S. Pat. No. 2,898,624 clearly states the problems in association with the processing of animal carcasses, particularly hogs. The U.S. No. 2,898,624 patent is particularly directed towards hind feet cleaning means. However, it should be pointed out that the U.S. No. 2,898,624 patent includes a cylindrical shaped rotating brush mounted on a shaft which is inclined between horizontal and vertical. As the carcass advances through the machine the entire body portion of the carcass is progressively contacted by the brush because of the inclined position of the brush. Additionally, because of the angle at which the carcass is contacted by the revolving brush, the carcass is caused to rotate on the swivel shackle. Rotation of the carcass permits the hind feet cleaning means to engage the entire circumference of each of the hind legs for the purpose of removing hair therefrom.

The U.S. Pat. No. 3,021,557 is directed toward a machine for stipping coatings of resin or the like for the purpose of removing hair and foreign material from carcasses. The following is quoted from the U.S. Pat. No. 3,021,557:

In presently known methods, hog carcasses are first scalded in hot water and then a major part of the hair is removed by means of scrapers or by mechanically driven and actuated scrapers. Said normal scraping does not remove most of the fine hair and dirt from the skin. The carcasses are then dipped in a relatively soft, hot, flowable liquid mixture of resin which is maintained at a temperature of approximately 250 to 280° F. The carcasses are then withdrawn from the resin mix in the tank and the resin congeals to form a relatively thick flexible coating which contains the projecting portions of the remaining hair. It is then necessary to remove the soft, flexible resin coating containing the hair by the use of hand scrapers in addition to hand scraping various parts of the hog to remove the hair and foreign matter which is not removed along with the resin coating.

In other words, the U.S. Pat. No. 3,021,557 discloses a device which is used in addition to the usual mechanical scraper or polisher.

SUMMARY OF THE INVENTION

The present invention is directed toward overcoming the disadvantages and problems relative to previous carcass polishing apparatus and is particularly directed towards providing a carcass polisher which more quickly and more economically removes scurf and singed hair from the entire carcass, including those previously hard to reach head and flank sections. As previously mentioned, prior known hog carcass polishers do not remove all of the hair from the head area of the carcass. Accordingly, assuming a kill rate of 300 head per hour, five employees are normally required, which are commonly referred to as shavers, to manually shave the hog carcass to eliminate the remaining hair. In actual practice, the carcass polisher of the present invention has been shown to greatly reduce the number of shavers required, e.g., two shavers can now accomplish the required shaving for the same 300 head per hour that previously required five shavers.

The apparatus of the present invention includes the typical overhead conveyor system and structure for suspending the carcass therefrom which enables the carcass to be free to rotate about a vertical axis. Multiple pairs of cylindrical like scrub brushes which rotate about their respective vertical axes are positioned on either side of the conveyor line to impart a twirling action to the carcass and to simultaneously scrub the entire area of the skin of the carcass. It should be pointed out that the apparatus of the present invention is intended to be stationed at a point along the conveyor system which is downstream from previous processing stations. For example, the steps in the processing preferably are: First, the animal is stunned and killed. Secondly, the carcass is dipped in a tub of scalding water or the like. Third, the carcass passes through a singeing cabinet which burns most of the hair from the carcass. Fourth, the carcass enters the carcass polishing apparatus of the present invention. Fifth, the carcass passes the shaving station where shavers manually remove the residual hair and the like.

DESCRIPTION OF THE PREFERRED EMBODIMENTS

Figure 1:
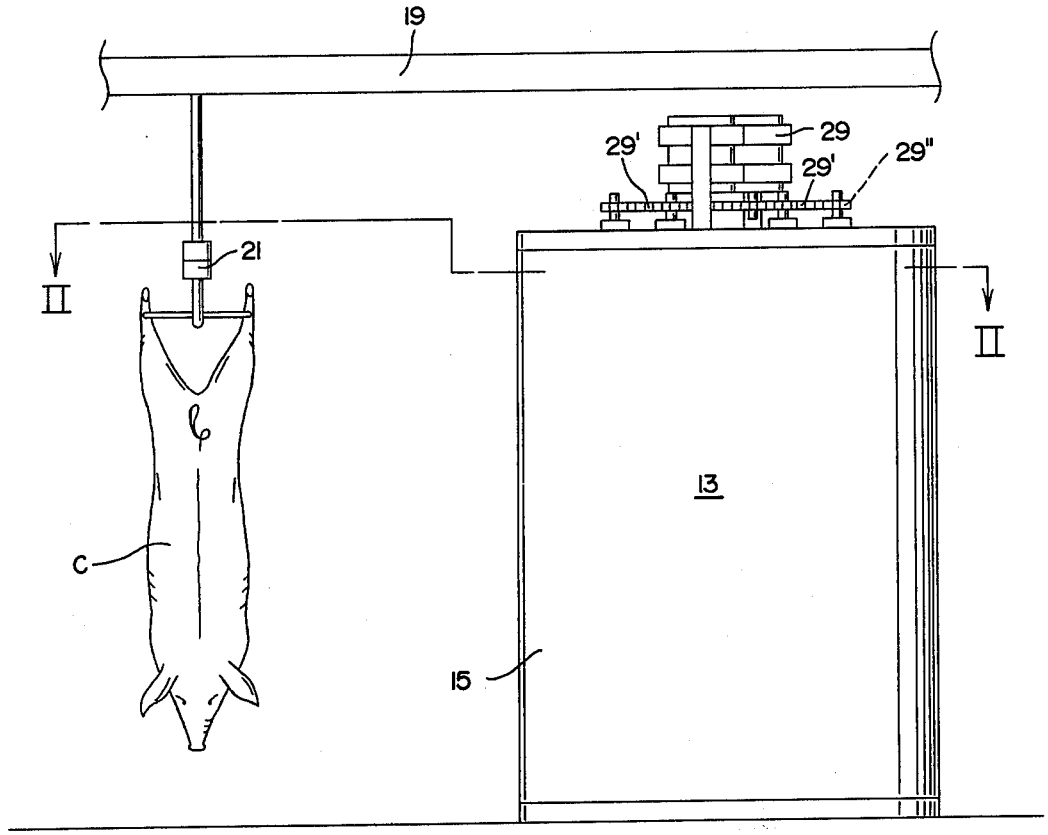
FIG. 1 is a side elevational view of the apparatus of the present invention, showing an overhead conveyor line moving a suspended carcass in work engaging proximity thereto.

The apparatus 11 of the present invention is intended for removing scurf and singed hair (not shown) from a carcass, as at C. The apparatus 11 includes frame means 13 having a pair of frame or casing elements, as at 15, 17. The apparatus 11 also includes means, e.g., a conveyor system 19, well known to those skilled in the art, for suspending and moving the carcass laterally between the frame elements 15, 17. Also included are means, e.g., a swivel 21 or the like, for enabling the carcass C to be free to rotate about a vertical axis as it moves between the elements 15, 17. The apparatus 11 is particularly characterized by multiple pairs of cylindrical like scrub brushes 23 which are individually designated as 23a, 23b, and 23c, etc. The brushes 23 are rotatably attached to the frame means 13 and are rotatably driven about their respective vertically disposed axes for vigorously engaging and scrubbing the carcass C and imparting a twirling action thereto to present substantially the entire area of the outer surface of the carcass C to each of the rotating scrub brushes 23 as the scurf and singed hair are scrubbed therefrom.

More specifically, the respective frame elements 15, 17 define confrontingly arranged openings, as at 25, 27. It should be understood that the swivel means 21 includes shackle means or the like for grasping the hind legs of the carcass C in a manner well known to those skilled in the art. The device 11 also includes means, e.g., an electric motor 29 or the like, for rotatably driving the scrub brushes 23 through suitable chains 29' and sprockets 29'', in a manner well known to those skilled in the art in directions to be fully described. From FIG. 2 of the drawings it may be seen that the circumferential portions, as at 31, of the brushes 23 protrude outwardly through and beyond the openings 25, 27 for vigorously engaging and scrubbing the suspended carcass C as it passes between the openings 25, 27 or between the frame elements 15, 17.

The efficiency of the apparatus 11 is fully achieved when the scrub brushes 23 have a predetermined direction of rotation. More specifically, from FIG. 2 of the drawings it may be seen that all of the scrub brushes, i.e., 23a, 23b, 23c, etc., in the multiple pairs thereof are rotatably driven counterclockwise, as indicated by the arrows 33, about their respective vertically disposed axes when viewed from above. However, the specific arrangement of the scrub brushes 23 dictates the direction of rotation thereof, i.e., all of the scrub brushes 23a, 23b, 23c, etc., may be rotatably driven clockwise. However, the clockwise rotation is contingent upon the order of other structure yet to be disclosed also being reversed.

Figure 2:
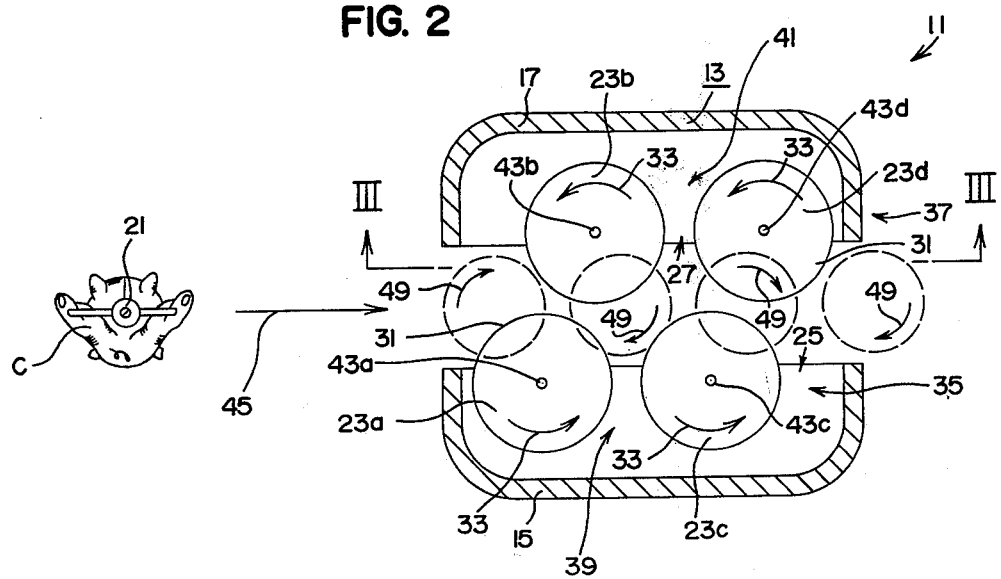
FIG. 2 is a sectional view taken as on the line II—II of FIG. 1, showing the preferred direction of travel for the carcass.

It should be pointed out that each pair of the above mentioned multiple pairs of scrub brushes include a right hand brush and a left hand brush, i.e., the brushes 23a, 23b constituting one pair and the brushes 23c, 23d constituting a second pair, etc. Further attention is now directed toward FIG. 2 of the drawings wherein it may be seen that the scrub brushes 23 are arranged in first and second rows, as at 35, 37 respectively, with each of the pairs of the multiple pairs thereof having one brush, e.g., brush 23a, in the first row 35 and one brush, i.e., the brush 23b, in the second row 37. Additionally, the scrub brushes 23 in the first and second rows respectively have spaced distances therebetween, as at 39, 41 respectively. Each of the plurality of scrub brushes 23 includes an elongated shaft 43 which is individually designated as 43a, 43b, and 43c, etc. The shafts 43 coextend vertically with the rotating axes of the respective brushes 23. The rotating axes, or more specifically, the concentrically disposed shafts 43, of the scrub brushes 23 in the first row, i.e., the shafts 43a, 43c, are arranged alternately with the spaced distances, as at 41, in the second row 37 whereby the carcass C alternately encounters individual rotating brushes on either side thereof as it passes laterally between the frame elements 15, 17. In other words, the brushes 23 of the rows 35, 37 are staggered, as best seen in FIG. 2. In this regard, it is significant to note the direction in which the conveyor system 19 moves the carcass C through the frame means 13. Accordingly, the carcass C is carried through the frame means 13 in the direction of an arrow 45. Stated another way, the carcass C first encounters the brush 23a situated on the right hand side of the conveyor system 19 before encountering the brush 23b situated on the left hand side of the conveyor 19, etc. for subsequent multiple pairs of the brushes 23.

If desired, the staggered arrangement of the multiple pairs of brushes 23 may be reversed. In other words, the first brush 23 encountered by the carcass C as it moves in the direction of the arrow 45 would then be on the left hand side of the conveyor 19. In this event, the direction of the rotation would preferably be just the opposite of that depicted by the arrows 33, i.e., if the first encountered brush 23 is on the left hand side of the conveyor 19 the direction of rotation of all of the brushes 23 preferably would be clockwise. From the above disclosure and a study of the drawings it can readily be seen by those skilled in the art that the direction of rotation of the brushes 23 is very significant. It should be noted that in either event the direction of rotation as above disclosed tends to urge the advancing carcass C rearwardly or against the direction carried by the conveyor system 19. In this manner, the carcass C is properly positioned to be effectively engaged by the scrub brushes 23.

Figure 3:
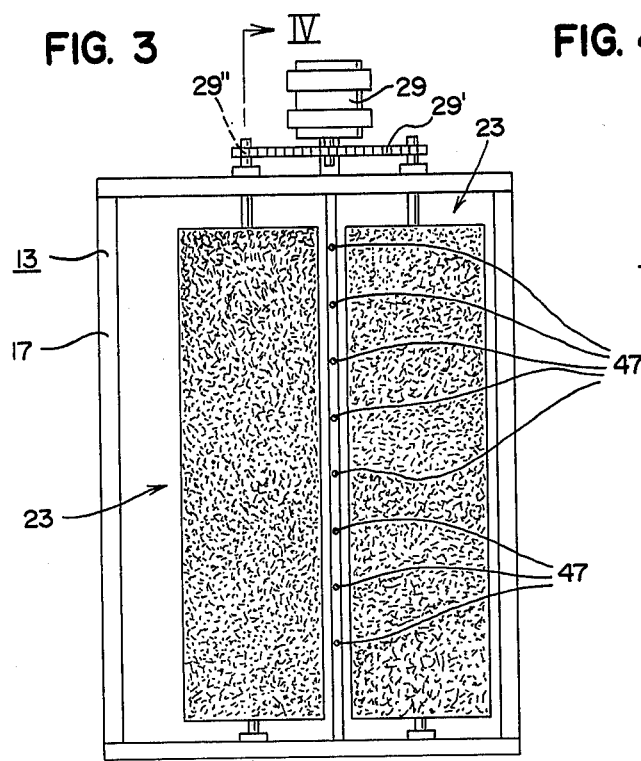
FIG. 3 is a sectional view taken as on the line III—III of FIG. 2.
Figure 4:
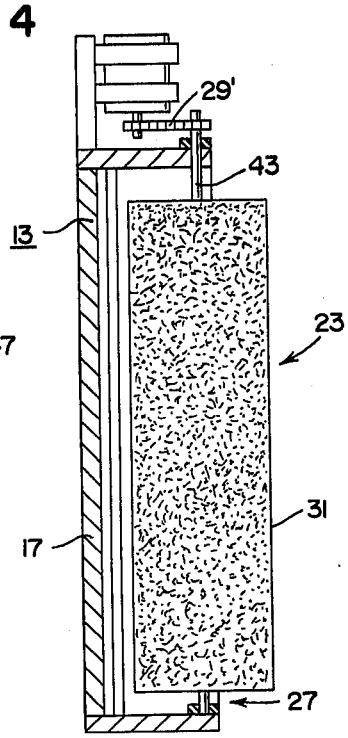
FIG. 4 is a sectional view taken as on the line IV—IV of FIG. 3.

The apparatus 11 preferably includes means, i.e., nozzles 47 (FIG. 3) which have water emanating outwardly therefrom, for spraying the carcass C with water as it is being vigorously engaged with the scrub brushes 23. The nozzles 47 preferably are disposed in at least two vertical arrays which respectively are attached to the frame elements 15, 17. In the interest of brevity, only one array of nozzles 47 is shown, it being midway between adjacent brushes disposed in each row, e.g., midway between the brushes 23a, 23c, etc. The second and subsequent arrays of nozzles 47 would be similarly disposed, e.g., midway between the brushes 23b, 23d, etc. It is equally significant to note that the direction of the brushes in the above discribed manner imparts a definite twist to the carcass, as indicated by the arrows 49. The twist of the carcass is only diagrammatically illustrated by the arrows 49. In other words, the carcass would probably twist about a vertical axis for approximately 18 complete revolutions as it is moved through the device 11, i.e., the device 11 in this instance having only two pairs of scrub brushes. It should be understood that if desired, the device 11 may include additional pairs of scrub brushes. This would enable the kill rate to be greatly increased, i.e., the conveyor 19 could be speeded up beyond the acceptable polishing capacity of only two pairs of scrub brushes. It should be understood that the two paris of scrub brushes do an excellent job of removing scurf and singed hair up to a maximum rate of 800 hogs per hour and the rate may be indefinitely increased by adding additional pairs of scrub brushes 23.

Each of the scrub brushes 23 includes the previously mentioned shaft 43 coextending vertically with the rotating axis thereof. Additionally, each brush 23 includes a multiplicity of bristles, as at 51, radially aligned with respect to the shaft. The bristles 51 are disposed or distributed along the length of the shaft 43 with the bristles being fixedly attached to the shaft 43 in a manner well known to those skilled in the art and commensurate with the latest state of the art, e.g., high tensile aircraft cable might be used to secure the bristles to the shaft 43.

Figure 9:
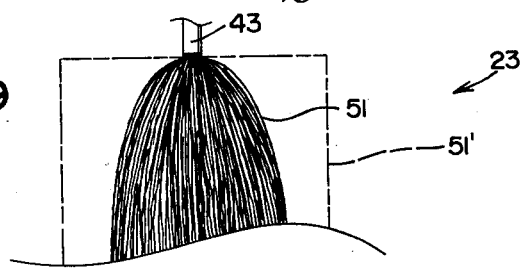
FIG. 9 depicts in solid lines the shape of the brushes in a static state while the dynamic state thereof is depicted in phantom lines.

The bristles 51 of the brushes 23 have a predetermined degree of resiliency and sufficient mass thereto to enable them to inherently droop when in a static condition as clearly shown in FIG. 9 of the drawing and to assume an erect disposition, as at 51', when influenced by centrifugal force as the shaft 43 is caused to rotate, as also clearly shown in FIG. 9 of the drawing.

Figure 7:
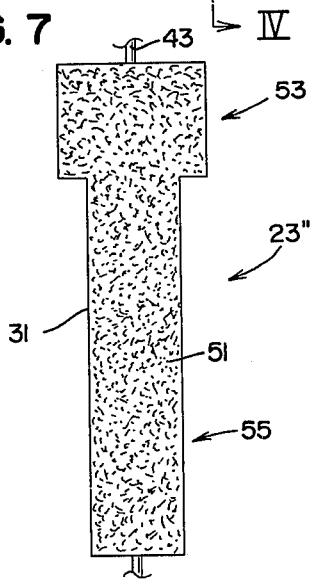
FIG. 7 is a view which is also similar to FIG. 5 showing still another embodiment for the brush structure incorporated with the present invention.
Figure 5:
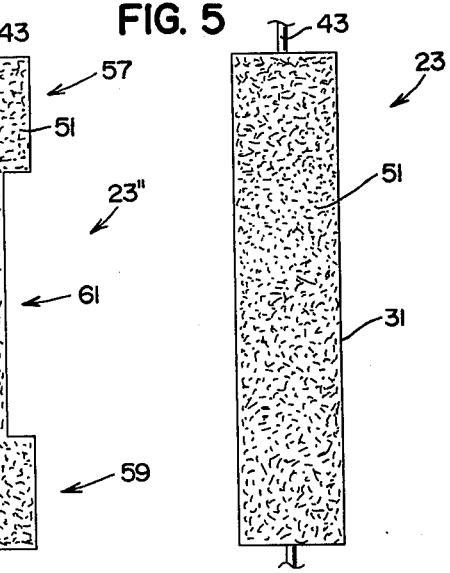
FIG. 5 is a side elevational view showing a preferred embodiment for the brush structure incorporated with the present invention.

An alternate embodiment of the brushes 23 is herein disclosed and is character referenced in FIG. 7 of the drawings by the numeral 23'. The multiplicity of bristles 51 for the scrub brush 23' defining the upper portions, as at 53, are longer than are the bristles 51 defining the lower portion thereof, as at 55. In other words, the longer bristles 51 defining the upper portion 53 are intended to assure that the hind leg area of the carcass C is effectively scrubbed. The brushes 23 and/or 23' may be used indiscriminately when arranging the multiple pairs thereof. In other words, the brushes 23a, 23c may optionally be shaped as above disclosed for the brush 23' while the brushes 23b, 23d have the same diameter along the length thereof, i.e., the bristles 51 thereof being substantially uniform in length over the entire length of the shaft 43 as shown in FIG. 5. On the other hand, it may be desirable that the brushes 23a, 23d be of the alternate embodiment, etc.

Figure 6:
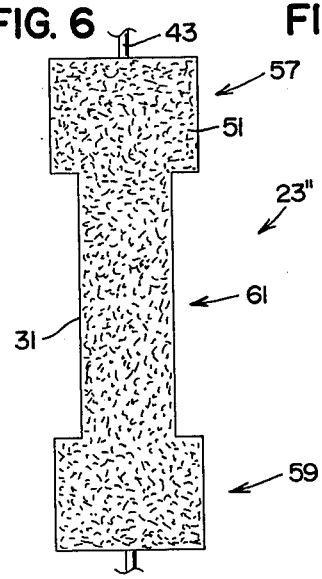
FIG. 6 is a view similar to FIG. 5 showing another embodiment for the brush structure incorporated with the present invention.

Another embodiment of the scrub brushes 23 is herein disclosed and is character referenced in FIG. 6 of the drawings by the numeral 23''. The multiplicity of bristles of the scrub brushes 23'' defining the respective upper and lower portions, as at 57, 59, thereof are longer than are the bristles 51 defining the respective intermediate portions thereof, as at 61. The advantage of the brush 23'' over the brush 23' is that the brush 23'' can be inverted to extend the usable life thereof. In other words, in the event the upper portion 57 becomes worn or the bristles 51 thereof become shortened, the scrub brush 23'' can simply be inverted to expose an unworn portion 59 to the hind quarters of the carcass C.

Figure 8:
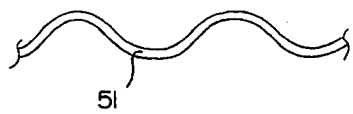
FIG. 8 is an enlarged view of a single bristle of the brush structure, showing the preferred shape of each bristle.

The multiplicity of bristles 51 preferably are wrinkled or sinuous along the length thereof as clearly shown in FIG. 8 of the drawings. The wrinkled configuration has been shown to be more effective in removing the scurf and singed hair than when the bristles are straight. In this regard, the bristles 51 preferably are formed from a plastic substance further identified as polypropolene WD-40, a substance well known to those skilled in the art.

Although the invention has been described and illustrated with respect to preferred embodiments thereof, it is to be understood that it is not to be so limited since changes and modifications may be made therein which are within the full intended scope of the invention.

I claim:

1. Apparatus for removing scurf and singed hair from a carcass, said apparatus comprising frame means having a pair of frame elements, means for suspending and moving the carcass laterally between said elements, means for enabling the carcass to be free to rotate about a vertical axis as it moves between said elements, and multiple pairs of cylindrical like shaped scrub brushes rotatably attached to said frame means, said scrub brushes being rotatably driven about their respective vertically disposed axes for vigorously engaging and scrubbing the carcass and imparting a twirling action thereto to present substantially the entire area of the outer surface of the carcass to each of said rotating scrub brushes as the scurf and singed hair are scrubbed therefrom, said scrub brushes being arranged in first and second rows with each of said pairs of said multiple pairs thereof having one brush in said first row and one brush in said second row, the scrub brushes in said first and second rows respectively having spaced distances therebetween, the rotating axes of said scrub brushes in said first row being arranged alternately with said spaced distances in said second row whereby the carcass alternately encounters individual rotating brushes on either side thereof as it passes laterally between said frame elements.

2. The apparatus of claim 1 in which is included means for spraying the carcass with water as it is being vigorously engaged with said scrub brushes.

3. The apparatus of claim 1 in which each of said scrub brushes includes an elongated shaft coextending vertically with the rotating axis thereof and a multiplicity of bristles radially aligned with respect to said shaft disposed along the length thereof and being fixedly attached thereto, and said bristles having a predetermined degree of resiliency and sufficient mass thereto to enable them to inherently droop when in a static condition and to assume an erect disposition when influenced by centrifugal force as said shaft is caused to rotate.

4. The apparatus of claim 3 in which said multiplicity of bristles defining the respective upper portions of certain of said scrub brushes are longer than are the bristles defining the respective lower portions thereof.

5. The apparatus of claim 3 in which said multiplicity of bristles defining the respective upper and lower portions of certain of said scrub brushes are longer than are the bristles defining the respective intermediate portions thereof.

6. The apparatus of claim 3 in which said multiplicity of bristles of certain of said scrub brushes are substantially uniform in length over the entire length thereof.

7. The apparatus of claim 3 in which said multiplicity of bristles are formed from a plastic substance.

8. The apparatus of claim 3 in which each of said multiplicity of bristles are wrinkled along the length thereof.

9. The apparatus of claim 8 in which said plastic substance consists of polypropolene WP-40.

10. Apparatus for removing scurf and singed hair from a carcass, said apparatus comprising a pair of laterally spaced apart boxlike frame elements defining confrontingly attached openings, overhead conveyor means extending between said frame elements for supporting and moving the carcass laterally between said openings, swivel means for suspending the carcass from said conveyor means with the carcass having the hind legs thereof shackled to said swivel means, multiple pairs of cylindrical like shaped scrub brushes rotatably attached to said frame units, and means for rotatably driving said scrub brushes; said scrub brushes having predetermined directions of rotation, the respective rotating axes thereof being vertically disposed, and having circumferential portions thereof protruding outwardly through said openings for vigorously engaging and scrubbing the suspended carcass as it passes between said openings; said rotating scrub brushes imparting a twirling action to the carcass causing substantially the entire area of the surface thereof to be presented to each of said scrub brushes as the scurf and singed hair are scrubbed therefrom, said scrub brushes being arranged in first and second rows with each of said multiple pairs thereof having one brush in said first row and one brush in said second row, the scrub brushes in said first and second rows respectively having spaced distances therebetween, and the rotating axes of said scrub brushes in said first row being arranged alternately with said spaced distances in said second row whereby the carcass alternately encounters individual rotating brushes on either side thereof as it passes laterally between said frame elements.

11. The apparatus of claim 10 in which all of the scrub brushes in said multiple pairs thereof are rotatably driven counter-clockwise about their respective vertically disposed axes when viewed from above.

12. The apparatus of claim 10 in which all of the scrub brushes in said multiple pairs thereof are rotatably driven clockwise about their respective vertically disposed axes when viewed from above.

* * * * *